US009477924B2

(12) United States Patent
Vadakkan (10) Patent No.: US 9,477,924 B2
(45) Date of Patent: Oct. 25, 2016

(54) ARTIFICIAL NEURAL CIRCUIT FORMING RE-ACTIVATIBLE FUNCTIONAL LINK BETWEEN THE POSTSYNAPTIC TERMINALS OF TWO SYNAPSES

(71) Applicant: Kunjumon Ittira Vadakkan, Winnipeg (CA)

(72) Inventor: Kunjumon Ittira Vadakkan, Winnipeg (CA)

( * ) Notice: Subject to any disclaimer, the term of this patent is extended or adjusted under 35 U.S.C. 154(b) by 168 days.

(21) Appl. No.: 14/068,835

(22) Filed: Oct. 31, 2013

(65) Prior Publication Data

US 2015/0058269 A1 Feb. 26, 2015

Related U.S. Application Data

(60) Provisional application No. 61/868,452, filed on Aug. 21, 2013.

(51) Int. Cl.
*G06N 3/063* (2006.01)
*G06N 3/04* (2006.01)

(52) U.S. Cl.
CPC .............. *G06N 3/063* (2013.01); *G06N 3/049* (2013.01)

(58) Field of Classification Search
CPC .............................. G06N 3/063; G06N 3/049
See application file for complete search history.

(56) References Cited

U.S. PATENT DOCUMENTS

| 3,476,954 | A | * | 11/1969 | Phillips | G06G 7/25 326/35 |
| 4,518,866 | A | * | 5/1985 | Clymer | G06N 3/063 326/35 |
| 5,541,759 | A | * | 7/1996 | Neff | H04B 10/275 370/282 |
| 2008/0154822 | A1 | * | 6/2008 | Loeser | G06N 3/0635 706/26 |
| 2013/0054504 | A1 | * | 2/2013 | Snyder | G06F 7/02 706/46 |

OTHER PUBLICATIONS

New Hardware for Massive Neural Networks, by Coon, published 1988.*
Synaptic Coupling Between Two Electronic Neurons, by Jacquir, published 2006.*
A supplementary circuit rule-set for the neuronal wiring, by Vadakkan, published May 1, 2013.*

* cited by examiner

*Primary Examiner* — Stanley K Hill
*Assistant Examiner* — Thomas Fink
(74) *Attorney, Agent, or Firm* — Wilson Daniel Swayze (57) ABSTRACT

An electronic neuronal circuit system to model the interaction between the postsynaptic terminal of a first synapse between two neurons and the postsynaptic terminal of a second synapse between two neurons includes comparators to model the presynaptic neurons of the synapses, plurality of three diodes connected to the comparators to model synapses, an AND gate and latch to model the formation of functional link between the postsynaptic terminals, and timer-controlled latches for controlling the life-span of the inter-postsynaptic functional link, durations of re-activation of inter-postsynaptic functional link and flow of activity through the output postsynaptic dendritic terminals.

2 Claims, 11 Drawing Sheets

ARTIFICIAL NEURAL CIRCUIT FORMING RE-ACTIVATIBLE FUNCTIONAL LINK BETWEEN THE POSTSYNAPTIC TERMINALS OF TWO SYNAPSES

TECHNICAL FIELD

This disclosure relates to a simulated electronic circuit capable generating functional relationship between the postsynaptic terminals of two different synapses.

BACKGROUND OF THE INVENTION

Large number of electronic neural circuits was invented based on pulse coding, changes in individual synaptic strength and spike-time dependent synaptic plasticity changes. However, electronic circuits that can demonstrate changes occurring between the postsynaptic terminals of two closely located synapses have not been invented.

SUMMARY OF THE INVENTION

Embodiments of the present invention provide a system of artificial electronic circuits capable of introducing functional links between the postsynaptic terminals of two simultaneously activated synapses between different neurons as occurs during associative learning. The present invention explains an electronic circuit system that can produce combined effect of different presynaptic terminal functions along with the formation of a re-activatible inter-postsynaptic functional link. One embodiment provides a method to simulate neurons and connections between two neurons through the junctions between them, namely the synapses. The spread of neuronal activity along the neuronal processes takes place through the spread of depolarization evoked by a sensory stimulus or by an action potential generated at the axon hillock. The activity then spreads from one neuron to the next uni-directionally through the synaptic junctions between the neurons with some synaptic delay. In comparison, electrical conduction through a conductor takes place by flow of electrons. Since synaptic function takes place with a synaptic delay of neurotransmission of 1 to 2 milliseconds, the mode of conduction taking place along the neurons is unlikely to affect the systems properties evolving out of the network activities. This allows simulation of neurotransmission along the neurons and across the synapses using electronic circuits for the purpose of testing emerging systems properties. Unidirectional flow of nerve conduction at the synapses is achieved by using diodes with additional components to obtain conduction delay comparable to that of the synaptic delay.

Another embodiment provides the simulation for the functional property of neurons to generate action potential by "all or none" phenomenon. In the present circuit, this phenomenon is modelled by the arrival of threshold number of at least two inputs out of the five inputs for the neuron to be activated. This function is carried out by a voltage comparator in the circuit that compares the integrated signal with a threshold signal in order to produce a resulting signal.

A third embodiment provides an electronic circuit representing formation of a functional link between the postsynaptic terminals of two closely located synapses when they are simultaneously stimulated. The life-span of these inter-postsynaptic functional links is regulated by using a re-settable electronic component simulating the biological life-span of the functional links between the postsynaptic terminals. Once formed, these functionally maintained links between the postsynaptic terminals can be re-activated by the activation of either one of the synapses resulting in the activation of the linked second postsynaptic terminal. Various aspects and features may be implemented using, for example, one or more of a system, tool, method or a processing device or performing a program or a set of instructions, an apparatus that includes a program or a set of instructions, a method and a computer program embodied in a tangible computer-readable that may include instructions, software, and other data. The units and their different features are described in detail in the following detailed descriptions, figures and claims.

BRIEF DESCRIPTION OF THE DRAWINGS

FIG. 5 shows a schematic summary diagram of the four states of the functional electronic circuit. STATE1 demonstrates that even if the postsynaptic terminals of two synapses are close to each other, arrival of activity at one of the postsynaptic terminals alone do not result in any change between the postsynaptic terminals. STATE2 demonstrates that simultaneous activation of two postsynaptic terminals between two synapses results in the formation of a functional link between them. STATE3 explains the maintenance of the functional link between the postsynaptic terminals in a dormant state after input signals stop arriving. This dormant state has a life-span during which it is re-activatable. STATE4 demonstrates re-activation of the previously formed functional link between the postsynaptic terminals by the arrival of neuronal activity at one of the postsynaptic terminals.

DETAILED DESCRIPTION OF THE PREFERRED EMBODIMENTS

In order that the present invention herein described may be fully understood, the following terms are provided.

The term "subject" as used herein includes all mammalian members of the animal kingdom including humans.

The term "neuron" as used herein means cell type in the nervous system that communicates with each other by the generation and spread of depolarization. Each neuron includes input processes, cell body and output processes.

The term "synapse" as used herein means junction between one of the outputs (presynaptic terminals) of a neuron and one of the input terminals (postsynaptic terminals) of the neuron in the next order.

The term "functional link" or "inter-postsynaptic functional link" used herein means functional connection formed between the postsynaptic terminals of two synapses when they are activated simultaneously. Once formed, they can be re-activated as a function of arrival of activity at either one of the functionally linked postsynaptic terminals.

Higher level functions of the nervous system such as memory and consciousness can be understood in a first-person perspective. To understand it from a second-person view, the anticipated mechanism needs to be replicated in an artificial system. The human nervous system has nearly $10^{11}$ neurons. Each neuron has a cell body and is connected with other neurons through incoming and outgoing terminals. Each neuron has nearly $5.2 \times 10^4$ input terminals and nearly the same number of output terminals. The input terminals of a neuron are called postsynaptic terminals or postsynapses or dendritic spines (represented by 100) and the output terminals are called presynaptic terminals or axonal terminals (represented by 103).

The basic electronic circuit unit described in the present invention is a building block for building large neuronal network to artificially produce various systems properties within the nervous system such as formation of internal sensations and concurrent behavioural motor activities.

The present invention relates to an artificial neuronal circuitry and is an electronic neuronal circuit unit based on the formation of structural equivalents capable of producing internal sensation of a form of the item when memories get retrieved in the presence of a cue stimulus. More specifically, the present electronic circuit unit forms reversible functional link between the postsynaptic terminals of two closely located synapses at the time of associative learning, hereafter referred to as inter-postsynaptic functional link. These links may be re-activated at the time of memory retrieval in the presence of the cue stimulus, if these links continue to exist at the time of arrival of the cue stimulus. This circuit consists of different electronic circuit parts that are modelled on the neuronal and synaptic structures. The present system is not based on the previously proposed synaptic strength changes described as Hebbian plasticity changes occurring at single synapses, at the time of associative learning. The present inter-postsynaptic functional link circuit does not utilize the traditional artificial neural networks, also referred to as a neuromorphic-synaptronic system, which is based on the synaptic strength changes occurring at individual synapses. Instead, the artificial neuronal circuitry of the present invention models the formation of inter-postsynaptic functional link between two synapses at the time of associative learning, which is re-activated later at the time of memory retrieval. This invention has made it possible to achieve all the functional requirements of the system without affecting any known normal functions. The present electronic circuit can be used to test for the formation of first-person properties of the nervous system functions that may eventually enable the user to transfer the mechanism of natural intelligence towards the development of artificial intelligence. In addition, the circuitry of the present invention can also be used to produce necessary motor neuron activation resulting in behavioural motor activities.

Disclosed is an analogue circuit that performs the function of formation of a reversible functional link with variable life-span, between the postsynaptic terminals of closely located synapses in a neural network during associative learning and capable of getting re-activated during memory retrieval. This electronic circuit comprises of a) diodes that function uni-directionally b) resistor-capacitor combination with conduction delay similar to the synapse, which is junction between the presynaptic terminal of one neuron and the postsynaptic terminal of the next order neuron, c) voltage sources capable of providing small spikes of voltages simulating miniature excitatory postsynaptic potentials (mEPSPs) arriving at the postsynaptic terminals from their presynaptic terminals, d) units of postsynaptic terminals that receive input voltages which may be added up to provide a threshold voltage to activate a comparator simulating generation of action potential as an "all or none" phenomenon and, e) the simultaneous activation of two postsynaptic terminals inducing a functional link between them such that at a later time-point, arrival of activity through one of the postsynaptic terminals alone is sufficient to re-activate the previously formed inter-postsynaptic functional link and induces activity at the linked postsynaptic terminal on the opposite side.

Figure 1:
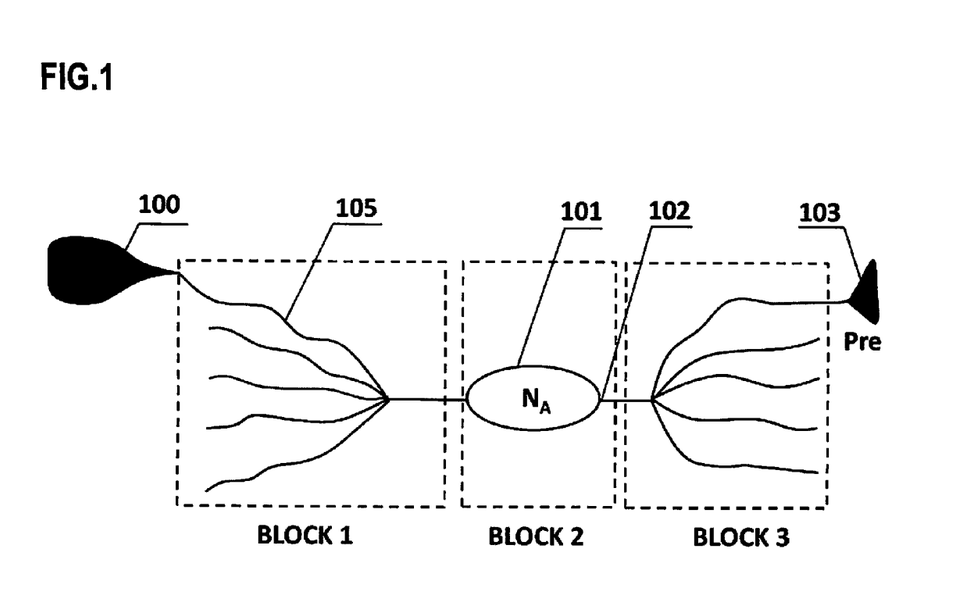
FIG. 1 shows the general diagram of the parts of a neuron. The box labelled Block 1 consists of five dendritic inputs (input terminals or postsynaptic terminals each marked as 100).
Figure 2:
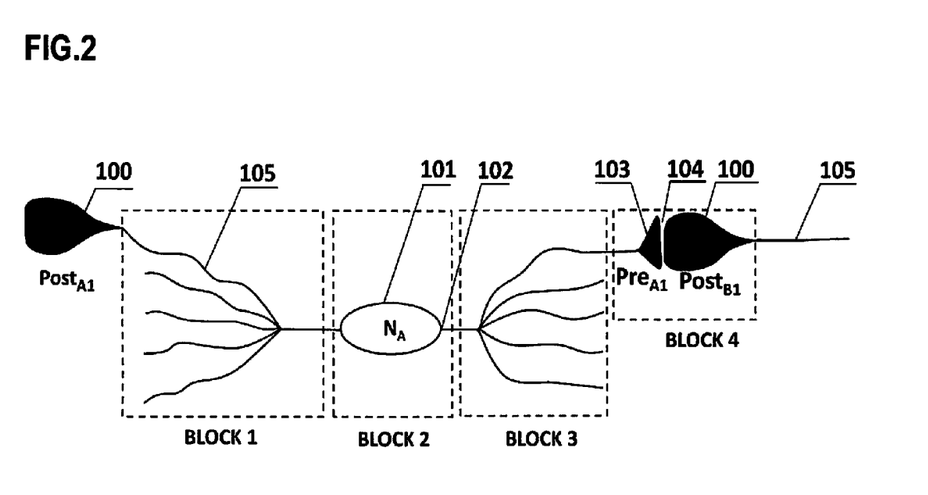
FIG. 2 shows the diagram of a neuron. One of the outputs (presynaptic terminals) marked as 103 of this neuron makes a synaptic junction 104 with one of the inputs (postsynaptic terminals) 100 of a neuron in the next order. Synaptic junction is marked by [$Pre_{A1}$-$Post_{B1}$].
Figure 3:
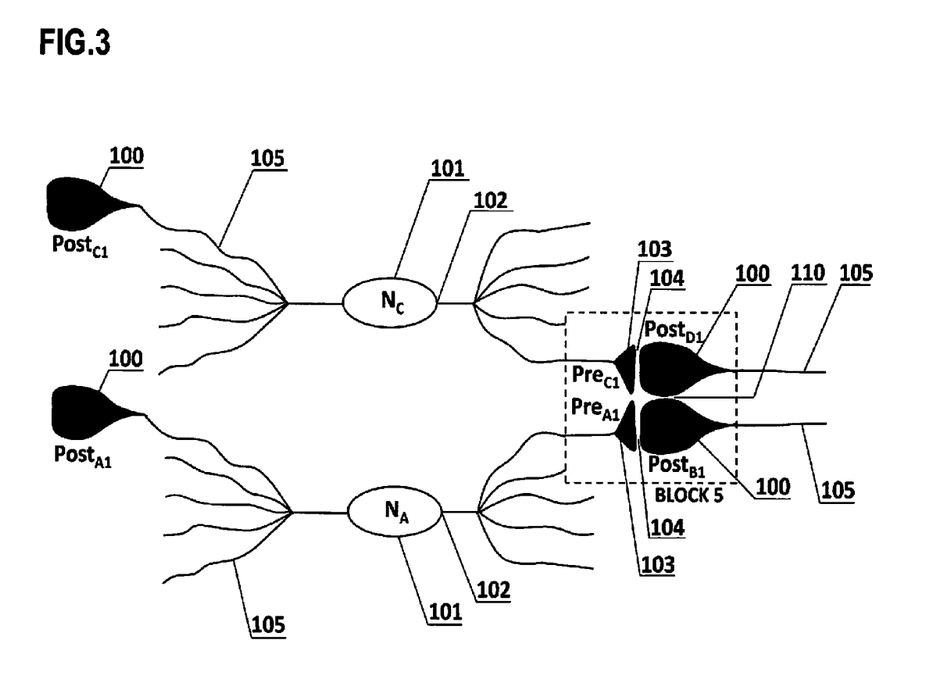
FIG. 3 shows two neurons with the synapses at one each of their output terminals. [$Pre_{A1}$-$Post_{B1}$] and [$Pre_{AC1}$-$Post_{D1}$] are the synapses. Simultaneous activation of closely positioned postsynaptic terminals (marked as 100) of these two closely located synapses (Block 5) results in the formation of a functional link between the postsynaptic terminals. This is expected to take place during associative learning. The inter-postsynaptic functional link [$Post_{B1}$-$Post_{D1}$] is marked by 110.
Figure 4:
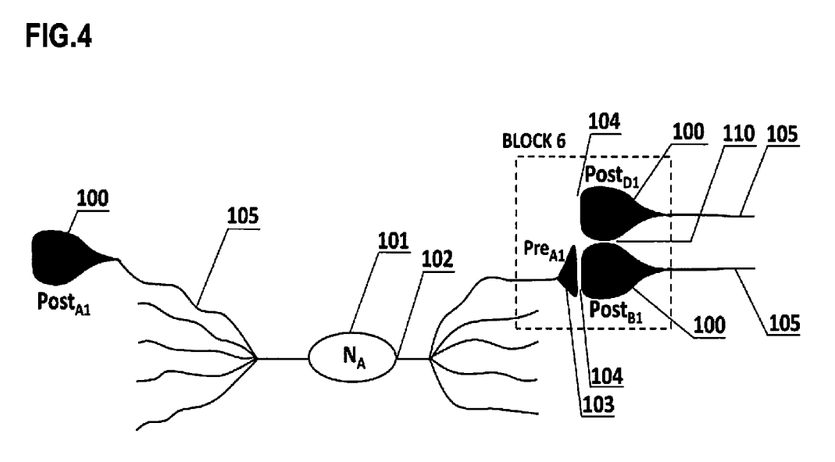
FIG. 4 shows schematic diagram showing re-activation of the previously formed functional link between the postsynaptic terminals of two closely located synapses, when one of the postsynaptic terminals is activated. This is expected to occur during the arrival of the cue stimulus that results in memory retrieval.

A neuron is the basic elementary cell that communicates with each other through neurotransmission at the junction between their input and output terminals and is the basic building block of a biological neural network. FIG. 1 shows a schematic diagram of a neuron that includes the input terminal 100, also called postsynaptic terminal or dendritic spine, cell body 101, axonal hillock 102, and output terminal 103 which is also called presynaptic terminal or axonal terminal. Postsynaptic terminals continue towards the neuronal cell body as dendrite 105. FIG. 2 shows one of the outputs terminals (presynaptic terminals) of the neuron $N_A$ forming a junction called synapse 104 with an input terminal (postsynaptic terminal) of the next order neuron $N_B$. The junction [$Pre_{A1}$-$Post_{B1}$] shown in the FIGS. 2, 3 and 4 represents the synapse 104. The nerve conduction transmits from one neuron to the next neuron through the synapses. The synaptic activity produces an excitatory postsynaptic potential (EPSP) at the postsynaptic terminal (input terminal) of the connected neuron and it propagates towards the axonal hillock, a region located close to the cell body. When the predetermined threshold number of EPSPs arrives at the axon hillock, they induce an action potential, by an "all or none" phenomenon. Even if the sum of EPSPs is very large, it will only produce the same action potential. If the sum of the EPSPs is less than the threshold, it will not induce an action potential. Once elicited, the action potential travels from the axonal hillock of the neuron towards all its output terminals (presynaptic terminals).

A neuronal electronic circuit that can be activated by the cue stimulus at the time of memory retrieval to induce systems properties of internal sensations is needed. This requires a mechanism for lateral entry of activity through inter-postsynaptic functional links to induce the systems property of internal sensation of the features of previously associatively learned items. In addition, these circuit units need to have provisions for controlling the life-span of the functional units that can determine the duration of memory storage.

FIG. 1 shows a single neuron with its connections. Block 1 consists of the input region. When threshold number of EPSPs reaches at the axon hillock 102 (represented by the junction between Block 3 and Block 4) of a neuron, they get summated to generate an action potential. The action potential spreads from the axon hillock to all the output terminals known as presynaptic terminals (Block 3 in FIG. 1). The end portion of only the first presynaptic terminal of the neurons is shown in FIGS. 1, 2, 3, 4, 6 and 7).

The input region in Block 1 and the axon hillock 102 are represented in the electronic circuits in FIGS. 8, 9, 10, and 11 as follows. The resistor sets 411, 412 and 413, 414 are representative resistors shown at one each of the input terminals of the neurons $N_A$ and $N_A$ whose values can be adjusted to determine the voltage from each input. In this embodiment, the axonal hillock 102 shown in the FIG. 1 is modelled by using the voltage comparator first and second OpAmps 416 and 427 in FIGS. 8, 9, 10 and 11. Resistors 455 and 456 form a voltage divider that provides V-value to the comparator. The resistor values are set up such that when the number of inputs to the V+ of the comparator is less than two, no output (action potential) is generated. If the number of inputs is two or more than two, an output is generated. Even if the neurons $N_A$ or $N_C$ receive all the five inputs, they elicit only one output (action potential). This makes the output function of the voltage comparator OpAmp similar to the functioning of "all or none" phenomenon of action potential generation at the axon hillock of a neuron.

$$\text{Action potential } (n) = \begin{vmatrix} 1, & \text{if } x_i n \geq 2 \\ 0, & \text{if } x_i n < 2 \end{vmatrix}$$

This is represented by the $V_{Out}$ of the comparators as follows $$V_{Out} \text{ of the comparator} = \begin{cases} \text{High} \leftarrow \Sigma V_{In} \geq V- \\ \text{Low} \leftarrow \Sigma V_{In} < V- \end{cases}$$

Before an associative learning event, independent activation of individual neurons 416 and 427 results in the generation of independent activity at their corresponding postsynaptic dendritic terminals 445 and 446 that are shown as the outputs of the circuit unit.

Synapses are the junctions between one of the output terminals (presynaptic terminals) of one neuron and one of the input terminals (postsynaptic terminals) of the next neuron. These are illustrated as 104 in the FIGS. 2, 3 and 4. They are also represented by [$Pre_{A1}$-$Post_{B1}$] and [$Pre_{C1}$-$Post_{D1}$] in FIGS. 2, 3, 4, 6, and 7. The structural components of the synapse are described in Block 4. The first synapse [$Pre_{A1}$-$Post_{B1}$] is represented by a plurality of diodes 333, 444 and 555 and the changes taking place between them. The second synapse [$Pre_{C1}$-$Post_{D1}$] is represented by a plurality of diodes 777, 888 and 999 and the changes taking place between them. Changes taking place across these diodes representing the synapse include unidirectional synaptic transmission, synaptic delay of 1 to 2 milliseconds, and the arrival of continuous miniature (small) excitatory postsynaptic potentials (mEPSPs) at the postsynaptic terminals. These are shown in FIGS. 8, 9, 10 and 11. Synaptic delay of 1 to 2 milliseconds is achieved in the synapses [$Pre_{A1}$-$Post_{B1}$] and [$Pre_{C1}$-$Post_{D1}$] by using the resistor capacitor sets 525, 526 and 815 and 816 respectively.

The discharge of the capacitors 526 and 816 through the resistors 525 and 815 respectively is given by the formula $V=V_o e^{-(t/RC)}$ where V=potential difference between the capacitor plates; $V_o$=initial voltage applied to the capacitor; t=charging or discharging time; R=resistance; C=capacitance. Synaptic delay time of the circuit depends on the time to charge the capacitor located at the presynaptic terminal.

The cathodes of the diodes 555 and 999 represent the postsynaptic terminals of the synapses [$Pre_{A1}$-$Post_{B1}$] and [$Pre_{C1}$-$Post_{D1}$] respectively. FIG. 2 shows one of the output terminals 103 [$Pre_{A1}$] of the neuron $N_A$ marked as $Pre_{A1}$ that forms a synapse 104 [$Pre_{A1}$-$Post_{B1}$] with an input terminal (postsynaptic terminal) 100 [$Post_{B1}$] of the next order of neuron marked as $Pre_{B1}$.

When either one of the first and second comparators 416 or 427 in FIGS. 8, 9, 10 and 11 representing the neurons $N_A$ and $N_C$ respectively is activated, all their output terminals (presynaptic or axonal terminals) receive the voltage. $Pre_{A1}$ and $Pre_{C1}$ are the two presynaptic terminals respectively of the neurons $N_A$ and $N_C$ that are shown in the FIGS. 2, 3, 4 and 6. $Pre_{A1}$ is represented by the circuit containing a plurality of diodes 333, 444 and the anode of the diode 555. $Pre_{C1}$ is represented by the circuit containing a plurality of diodes 777, 888 and the anode of the diode 999. They are shown in the FIGS. 8, 9, 10 and 11. $Post_{B1}$ and $Post_{D1}$ are the two postsynaptic terminals shown in the FIGS. 3, 4, 6 and 7 and are represented by the cathodes of the diodes 555 and 999 in FIGS. 8, 9, 10 and 11. When activity reaches at a synapse, it elicits an excitatory postsynaptic potential (EPSP) at the postsynaptic terminal (input terminal) of the next neuron.

During associative learning, if a synapse at the axonal terminal of a neuron gets simultaneously activated with another synapse from a second stimulus-induced activity, then inter-postsynaptic functional link can be formed between them provided their postsynaptic terminals are located physically close to each other. Arrival of the activity through either the synapses [$Pre_{A1}$-$Post_{B1}$] and [$Pre_{C1}$-$Post_{D1}$] represented by the diodes 555 and 999 respectively, while the inter-postsynaptic functional link remain functionally dormant, results in the re-activation of the functional link and activation of the functionally linked postsynaptic terminal. This is expected to occur at locations of convergence of inputs from various sensory stimuli, for example, the hippocampus. FIG. 3 illustrates two neurons $N_A$ and $N_C$ that are activated simultaneously. The synapses at the output terminals (axonal terminals) $Pre_{A1}$ and $Pre_{C1}$ of neurons $N_A$ and $N_C$ respectively shown in FIGS. 2, 3, 4 and 6 are located physically close to each other at various locations in the nervous system where sensory inputs converge and are shown in Block 5 and Block 6. When these synapses are activated simultaneously during associative learning, a functional link is formed between their postsynaptic terminals $Post_{B1}$ and $Post_{D1}$ In the electronic circuit, this is represented by the formation of a reversible link between the cathodes of the diodes 555 and 999. The inter-postsynaptic functional link [$Post_{B1}$-$Post_{D1}$] marked as 110 in the Block 5 and Block 6 is translated to an electronic circuit in FIGS. 8, 9, 10 and 11. This is primarily represented by the operation of the latch 1000. When both the neurons $N_A$ and $N_C$ are activated together, the output terminals are functionally linked by the arrival of sufficient activity at the AND gate 419 and the latch 1000.

$V_{In}$ of the 1$^{st}$ input of the AND gate 419=$V_{Comp}$(416)−(($V_{drop}$(333)+($V_{drop}$(444)+($V_{drop}$(555)))

$V_{In}$ of the 2$^{nd}$ input of the AND gate 419=$V_{Comp}$(427)−(($V_{drop}$(777)+($V_{drop}$(888))+($V_{drop}$(999)))

Once triggered, the latch 1000 continuously provides output. This is equivalent to the formation of an inter-postsynaptic functional link that remains functional following an associative learning event. The life-span of the inter-postsynaptic functional link varies and is responsible for the duration of memory storage. The reset function of the latch 1000 is controlled by the timer 800 that determines the duration of the latch function and guides to adjust the duration of operation of the system. Once triggered, the constant output from the latch continuously reaches one of the inputs to the second AND gate 422. At a later time, arrival of sufficient stimuli capable of activating either one of the neurons $N_A$ or $N_C$ provides the second input to activate the AND gate 422.

FIG. 4 illustrates the re-activation of the functional link [$Post_{B1}$-$Post_{D1}$] marked as 110 that was already formed between the postsynaptic terminals. Re-activation of the inter-postsynaptic functional link at the time of memory retrieval is modeled in Block 6. When activity reaches at any one of the postsynaptic terminals that were linked together, the inter-postsynaptic functional link gets re-activated. For example, when neuron $N_A$ is activated at a later time after associative learning, it activates the postsynaptic terminal $Post_{B1}$ at one of its synapses. This leads to the re-activation of the inter-postsynaptic functional link [$Post_{B1}$-$Post_{D1}$] and activates the linked postsynaptic terminal $Post_{D1}$.

Figure 5:
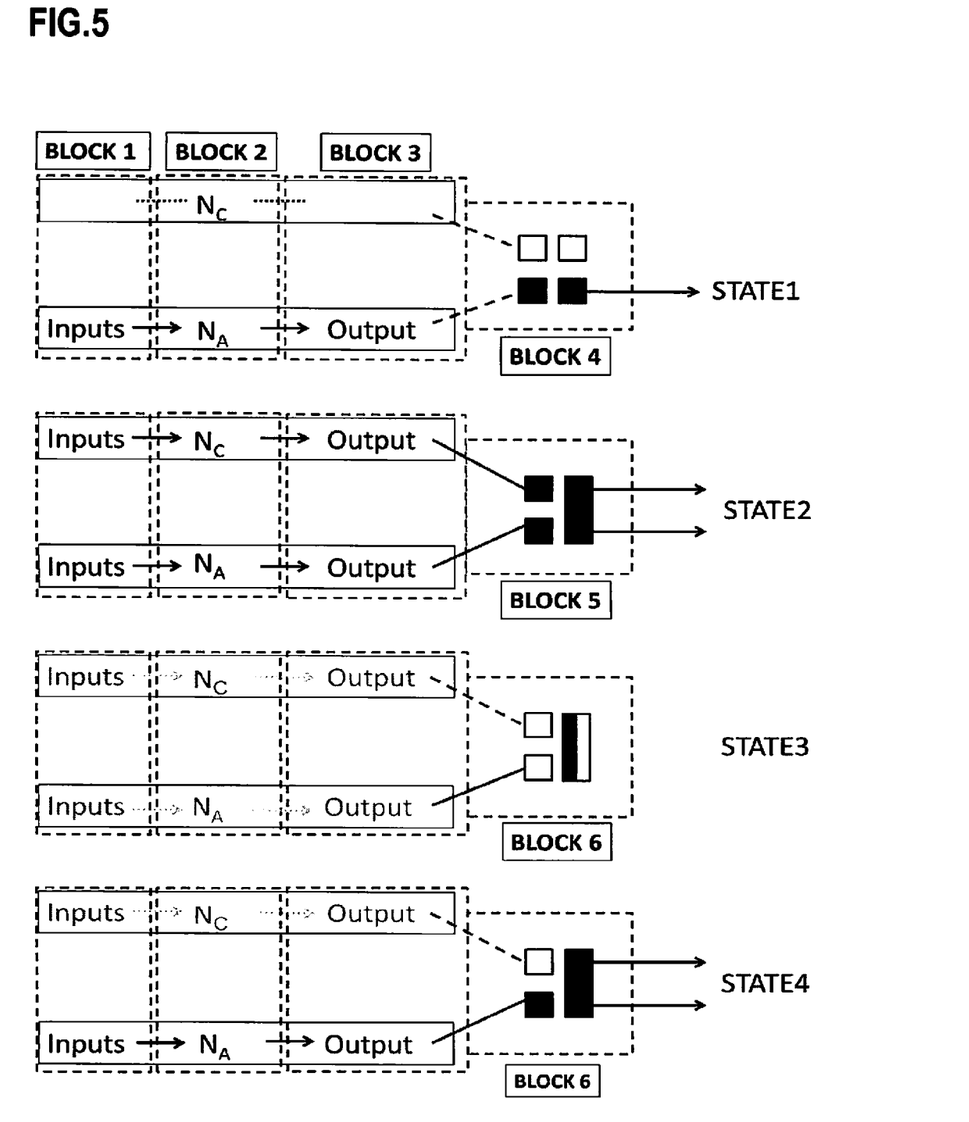

FIG. 5 shows summary of the four states of the functional electronic circuit. STATE1 explains native synaptic function before undergoing associative learning. It demonstrates that even if the postsynaptic terminals of two synapses are close to each other, arrival of activity at one of the postsynaptic terminals alone does not result in any change between the postsynaptic terminals. STATE2 demonstrates that simultaneous activation of the postsynaptic terminals of two synapses results in the formation of a functional link between them. STATE3 demonstrates that once functional link is formed between the postsynaptic terminals by associative learning, then the arrival of activity at one of the postsynaptic terminals results in the re-activation of the previously formed inter-postsynaptic functional link. A comparative diagram demonstrating the similarities between the formation of inter-postsynaptic functional link during associative learning and the main components of an electronic circuit equivalent to the functional link shown in the embodiment of the present invention is given in FIG. 6. Similarly, a comparative diagram demonstrating the re-activation of the inter-postsynaptic functional link during memory retrieval and the main components of an equivalent electronic circuit is shown in FIG. 7.

Figure 8:
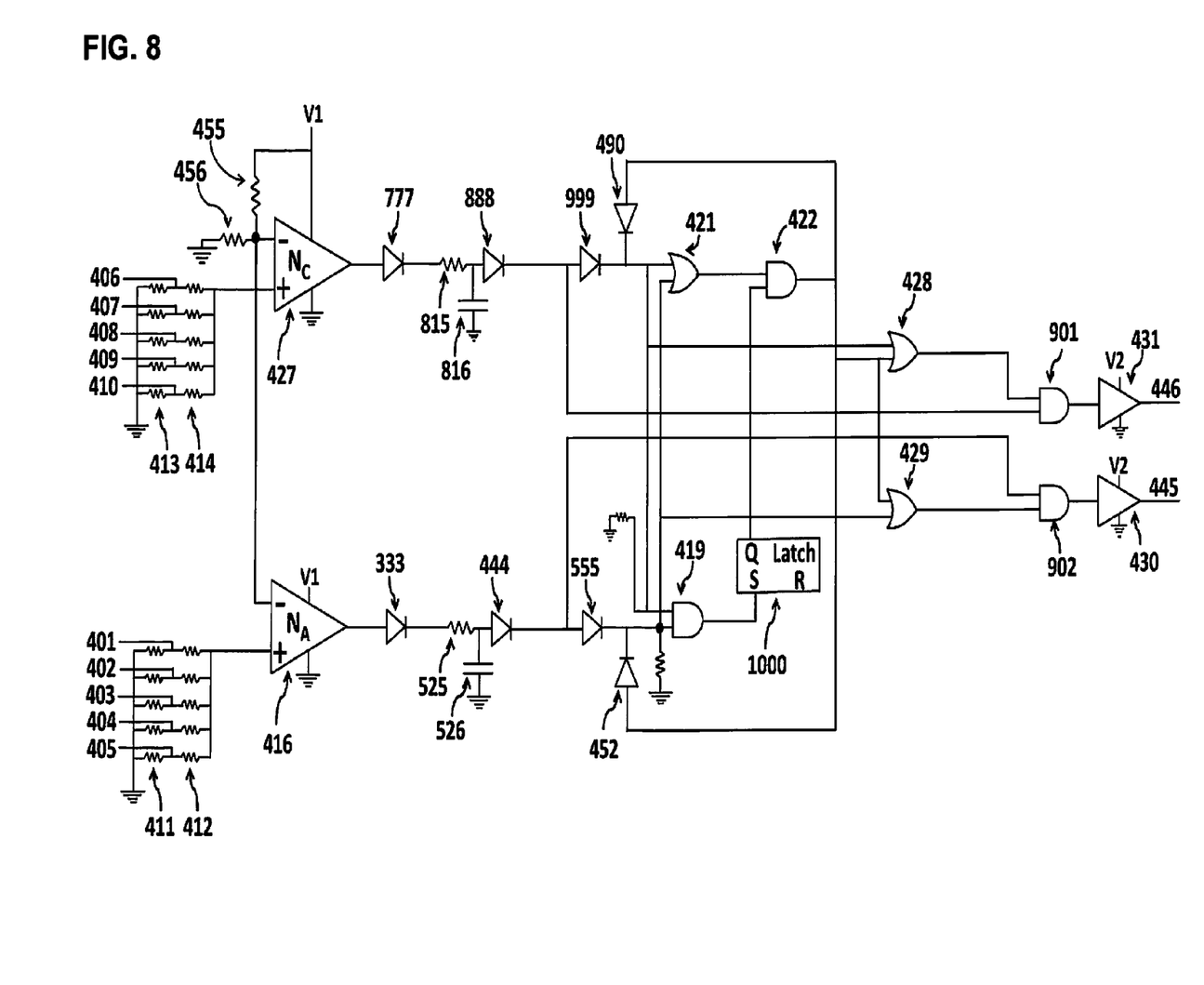
FIG. 8 shows the analogue circuit diagram where simultaneous activation of neurons results in the formation of functional link between the postsynaptic terminals at the synapses located at one each of their output terminals (presynaptic terminals) as described in FIG. 6. The resistor-capacitor circuit within the presynaptic terminal area provides mechanism for simulating the synaptic delay. This circuit also explains how the inter-postsynaptic functional link can be re-activated during arrival of activity through one of the neurons, for example during memory retrieval, as described in FIG. 7. This figure shows only a basic circuit for the formation and re-activation of the inter-postsynaptic functional link. This is modified by introducing additional features and is shown through FIGS. 9, 10 and 11.

FIG. 8 shows the basic structure of the electronic circuit generating a) electronic equivalent for bringing effects similar to that of action potentials at the axon hillock of the neurons $N_A$ and $N_C$ and b) formation of inter-postsynaptic functional link [$Post_{B1}$-$Post_{D1}$] between the postsynaptic terminals of the synapses at one each of their output (axonal or presynaptic) terminals. The input terminals similar to 100 shown in FIG. 1 are represented by voltage inputs numbered from 401, 402, 403, 404 and 405 to the neuron $N_A$ and 406, 407, 408, 409 and 410 to the neuron $N_C$ in the FIGS. 8, 9, 10 and 11. The nearly $5.2 \times 10^4$ input terminals (postsynaptic terminals receiving EPSPs in FIG. 1) to a neuron are represented by the above five input terminals to each neuron $N_A$ and $N_C$. When an excitatory synapse is activated, it induces excitatory postsynaptic potential (EPSP) at the postsynaptic terminal. A regulated direct current power supply is used to provide constant voltage to the five input terminals 401, 402, 403, 404 and 405 of the neuron $N_A$ and 406, 407, 408, 409 and 410 of the neuron $N_C$ in the FIGS. 8, 9 and 10.

When activity from the postsynaptic terminals (cathodes of the diodes 555 and 999) arrives at the AND gate 419, it latches the latch 1000 providing continuous output from it, until the latch is switched off when the life-span of the inter-postsynaptic functional link ends. The output from the latch 1000 represents the dormant inter-postsynaptic functional link formed during associative learning. The AND gate 422 receives one of its inputs from the output of the latch 1000. The second input to the AND gate 422 arrives from activity from either one or both of the inputs from the neuron $N_A$ or $N_C$ through the OR gate 421. Activation of the AND gate 422 represents the re-activation of the inter-postsynaptic functional link.

From the AND gate 422, the activity reaches the postsynaptic terminals of both synapses. These take place through the AND gate 450 and diode 452 towards the postsynaptic terminal of the synapse [$Pre_{A1}$-$Post_{B1}$] being represented by the cathode of the diode 555, and the AND gate 480 and diode 490 towards the postsynaptic terminal of the synapse [$Pre_{C1}$-$Post_{D1}$] being represented by cathode of the diode 999. During memory retrieval, activation of either one of the input neurons $N_A$ or $N_C$ by the cue stimulus leads to re-activation of the inter-postsynaptic functional link [$Post_{B1}$-$Post_{D1}$] that results in the arrival of activity at the cathode (postsynaptic terminal) side of the functionally linked postsynaptic terminals 555 or 999.

When the neuron $N_A$ is activated following associative learning, the diode 555 that represents its synapse is activated. When the voltage reaches the cathode of the synapse 555, it re-activates the inter-postsynaptic functional link [$Post_{aI}$-$Post_m$] that was formed during associative learning and the voltage reaches the cathode of the diode 999 that represents the functionally linked postsynaptic terminal of the neuron $N_C$. This arrival of activity at the cathode of the diode 999 in the absence of arrival of activity from its anode is expected to produce cellular hallucination that it is being activated by the anode of the diode 999 as a systems property. This unique property of the circuit is expected to occur when circuit units are used in large numbers and in orders that mimic the nervous system. Activating a postsynaptic terminal without arrival of activity from its corresponding presynaptic terminal is expected to form basic units of internal sensations as a systems property when large number of units is arranged similar to that is found in the nervous systems of different animal species.

Figure 9:
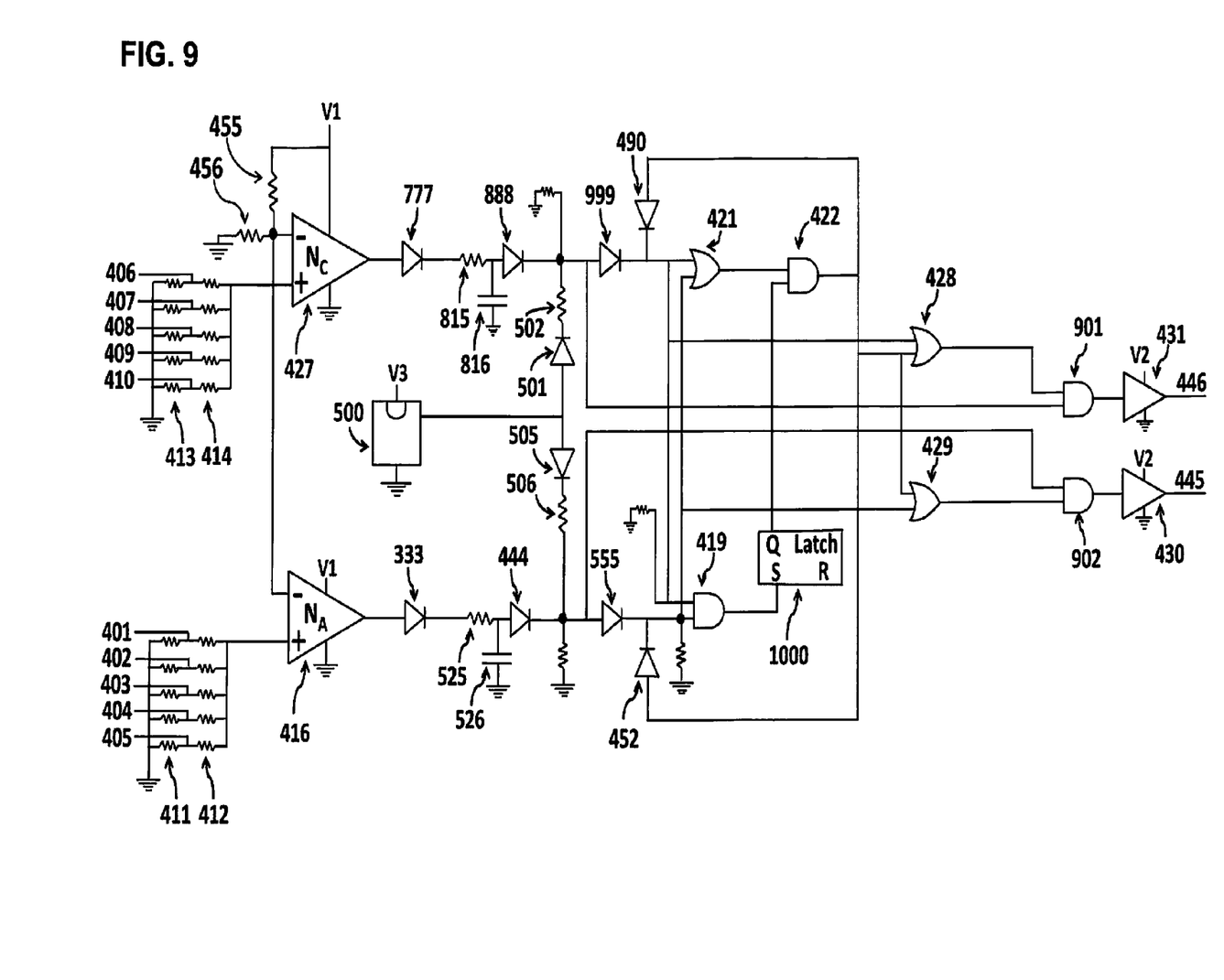
FIG. 9 shows modification of FIG. 8 showing the postsynaptic terminals of the synapses continuously receiving miniature excitatory postsynaptic potentials (mEPSPs) from the presynaptic terminal.

FIG. 9 shows the arrival of miniature (very small) excitatory postsynaptic potentials (mEPSPs) from the presynaptic terminal. Normal synaptic transmission takes place by release of neurotransmitters from large number of synaptic vesicles from the presynaptic terminal only at the time of arrival of neuronal activity. In contrast, quantal release of neurotransmitters from single presynaptic vesicle continuously elicits miniature (small) potentials to the postsynaptic terminal even at rest. These are called miniature EPSPs (mEPSPs). The voltage generated by quantal release at rest generating mEPSP is substantially lower than the voltage induced by EPSP generated by the arrival of an action potential at the presynaptic terminal.

$$\left\{\begin{array}{l}\text{mEPSP at the postsynaptic}\\\text{terminal induced by release}\\\text{of single vesicle}\end{array}\right\} \ll \left\{\begin{array}{l}\text{EPSP at the postsynaptic terminal}\\\text{induced by the arrival of action}\\\text{potential at the presynaptic terminal}\end{array}\right.$$

Figure 6:
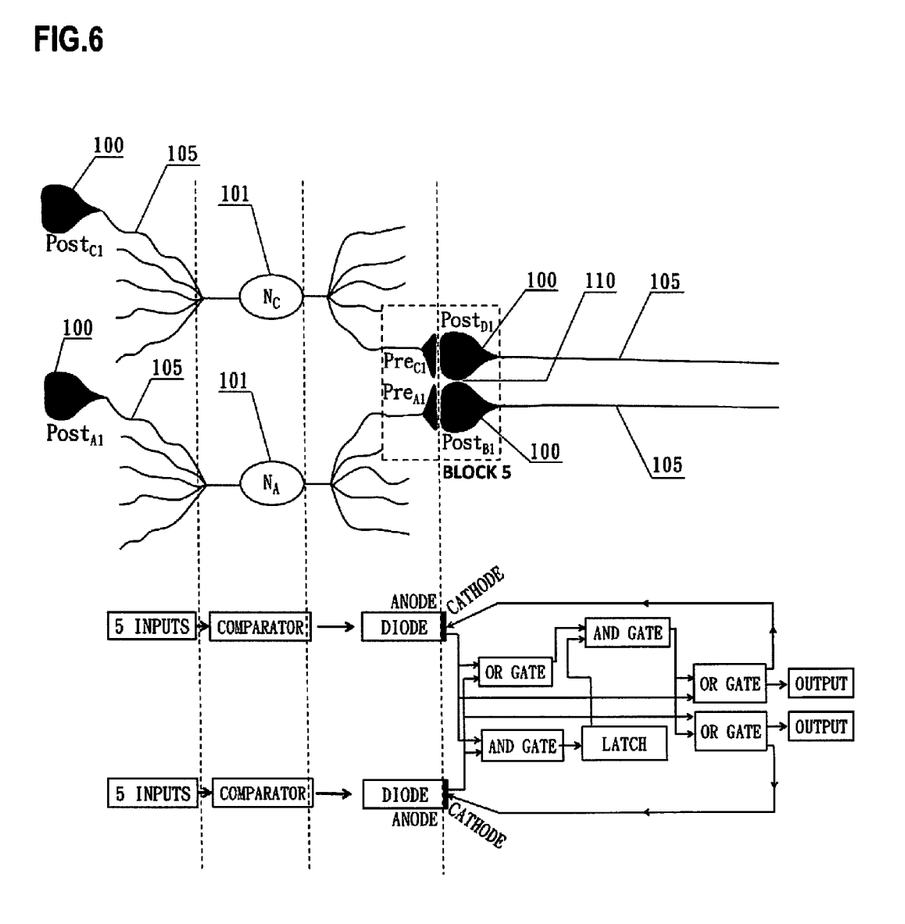
FIG. 6 shows comparative diagram of the STATE2 in the neuronal circuit in FIG. 5 and the corresponding electronic circuit diagram of an artificial neural circuit that leads to the formation of functional link between the postsynaptic terminals, according to the embodiments of the present invention.
Figure 7:
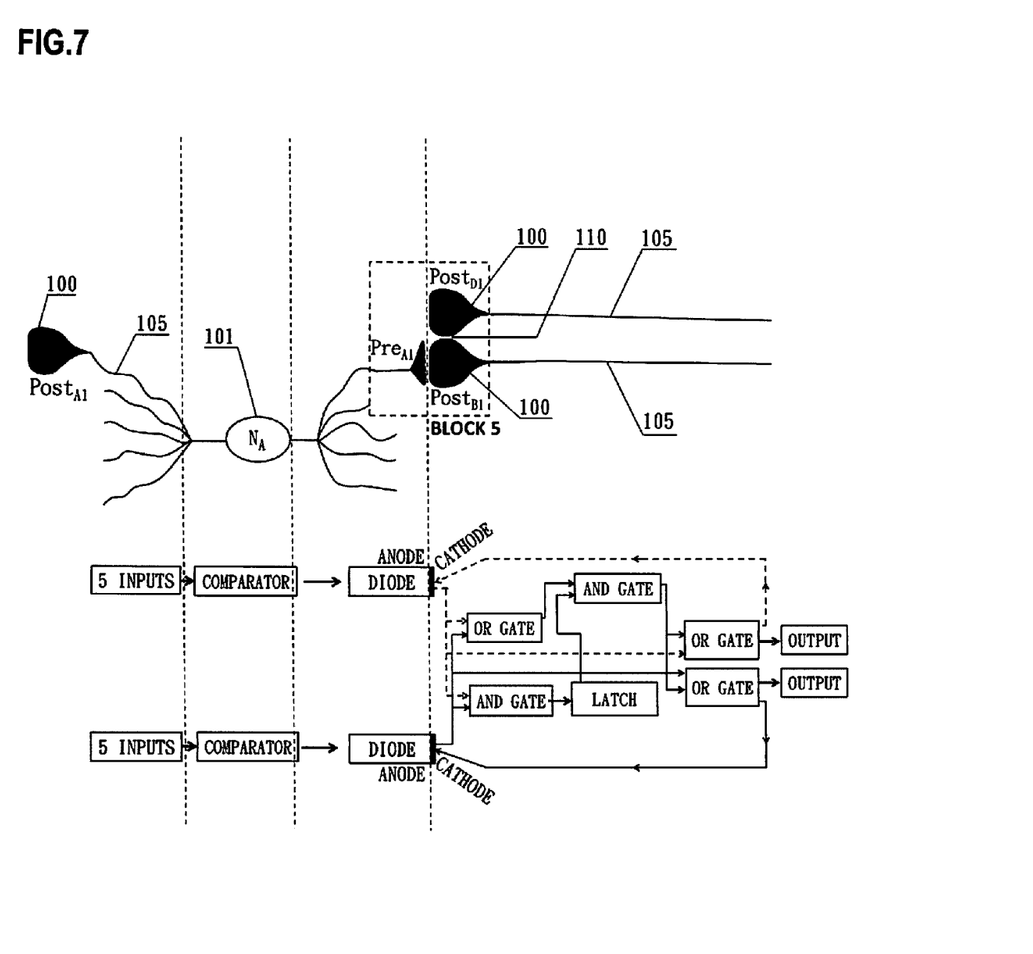
FIG. 7 shows comparative diagram of the STATE4 in the neuronal circuit in FIG. 5 and the corresponding electronic circuit diagram of an artificial neural circuit that leads to the re-activation of the functional link between the postsynaptic terminals, according to the embodiments of the present invention. Circuitry along the dashed lines with arrows is activated by the re-activation of the inter-postsynaptic functional link.

The cathodes of the diodes 555 and 999 that represent the postsynaptic terminals $N_{B1}$ and $N_{D1}$ in FIGS. 3 and 6 continuously receive mEPSPs from their corresponding presynaptic terminals $N_{A1}$ and $N_{C1}$ respectively. The voltage source for mEPSP is represented in FIG. 9 as follows. Timer IC 500 provides continuous intermittent miniature voltages through the sets of diodes and resisters 501 and 502 and, 505 and 506. The miniature voltages at the anode of the diodes 555 and 999 continuously cross to the cathode side of the diodes 555 and 999 that represent the postsynaptic terminals of the synapses. Due to the miniature nature of these voltages, they do not contribute towards the activation of the neurons in the next neuronal order. The continuous arrival of miniature voltage at the cathodes (that represents the postsynaptic terminal) of the diodes (that represent the synapse) 555 and 999 even at rest is a feature of the system. It is this context of continuous arrival of mEPSPs at a postsynaptic terminal, even at rest, that results in the creation of cellular hallucination of arrival of activity from corresponding presynaptic terminal when activity arrives at the postsynaptic terminal through lateral entry via the inter-postsynaptic functional link.

Figure 10:
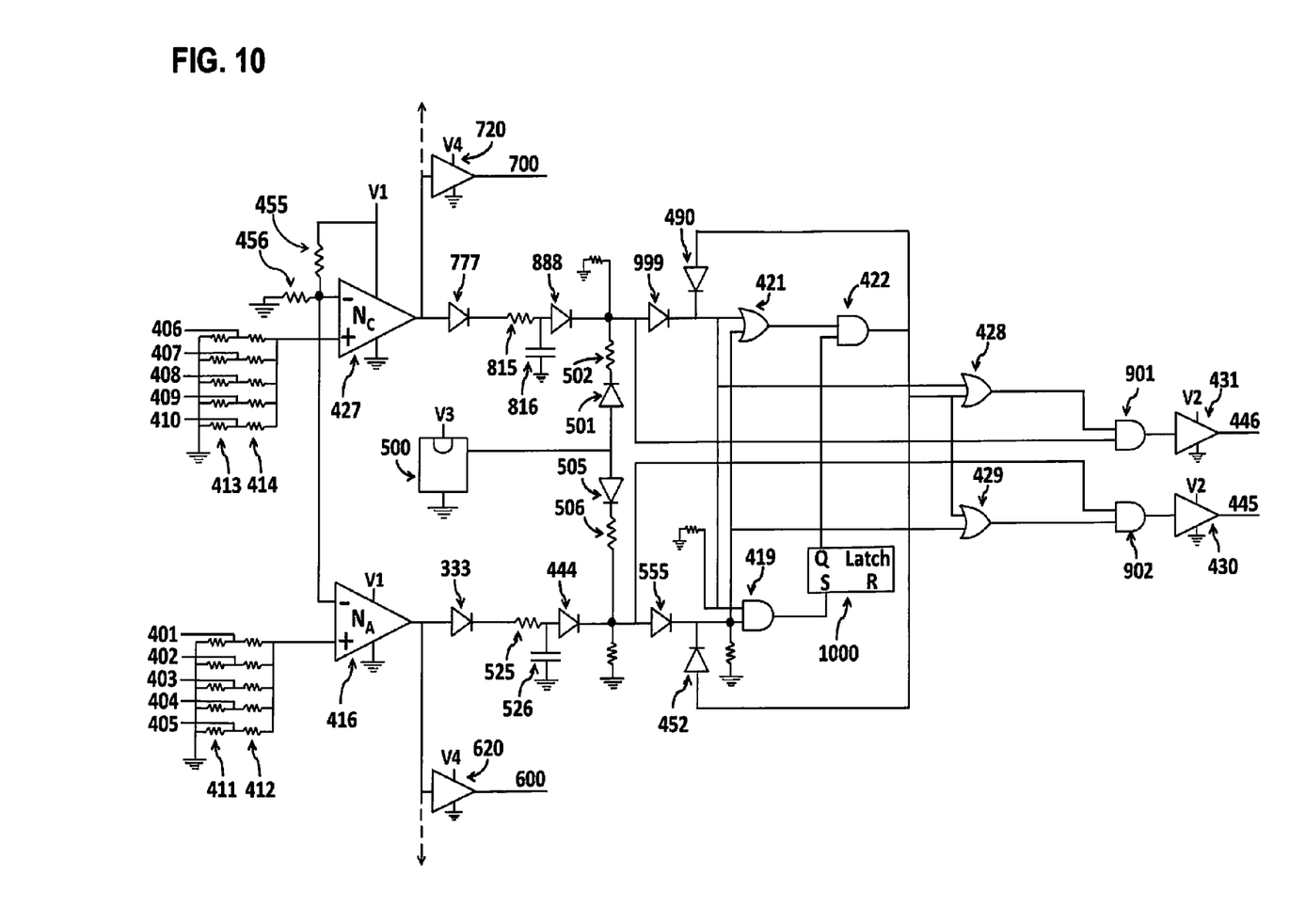
FIG. 10 shows modification of FIG. 9 by including additional presynaptic terminals 600 and 700 from the neurons $N_A$ and $N_C$.

FIG. 10 shows the modification of FIG. 9 by including additional presynaptic terminals from the neurons $N_A$ and $N_C$. These additional presynaptic terminals are represented by first and second elements 600 and 700 and are originated by using the first and second buffers 620 and 720 respectively. Formation of inter-postsynaptic functional links between the postsynaptic terminals of the synapses that are formed at the additional output terminals enables building large systems.

Figure 11:
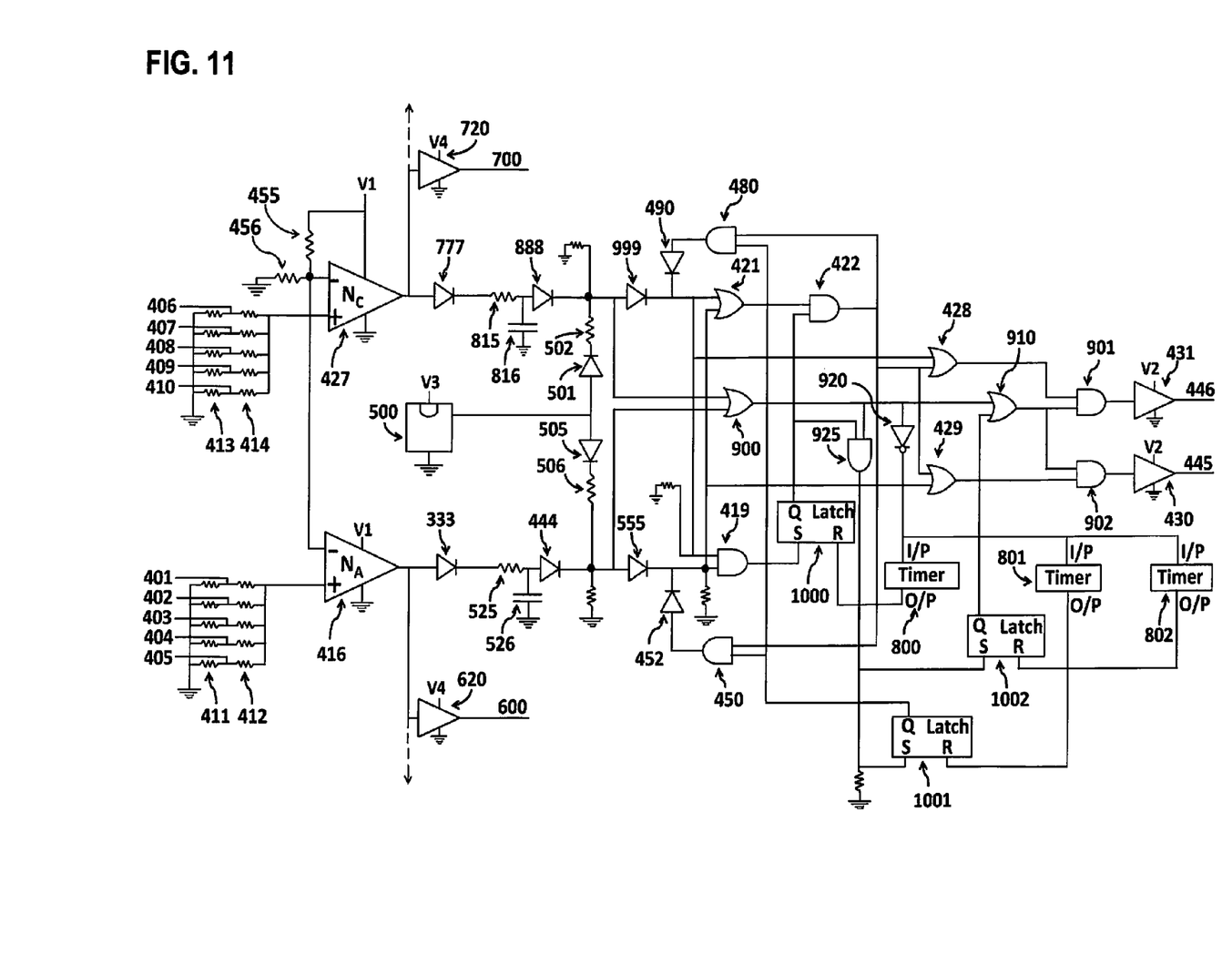
FIG. 11 is an electronic circuit diagram of an artificial neural circuit, according to the embodiments of the present invention. It is modified from the FIG. 10. The circuit has external controls for adjusting the duration of a) inter-postsynaptic functional link, b) duration of outputs through the postsynaptic terminal dendrites and c) duration of re-activation of the functionally linked postsynaptic terminals, providing a flexible circuitry to achieve the functioning of the nervous system.

FIG. 11 illustrates how the life-span of inter-postsynaptic functional link and the downstream effects of the link are controlled in the circuit. Following associative learning, when the inter-postsynaptic functional link remains active, which is represented by the state of the latch 1000 to remain as latched, the arrival of activity through either one of the neurons $N_A$ or $N_B$ activates the latches 1001 and 1002. The activation of the latches is facilitated through the AND gate 925. The arrival of activity through either one of the inputs activates the latch 1001 and provides the second input to the AND gates 450 and 480. This part of the circuit provides control of the duration of activation of the functionally linked postsynaptic terminals. The arrival of activity through either one of the inputs activates the latch 1002 and provides the second input to the OR gate 910. This part of the circuit provides output from the circuit unit. When the AND gate 422 is activated, it simultaneously provides output from the unit through both the first and second outputs 445 and 446. Note that steady voltage in the first and second postsynaptic dendrites 445 and 446 are provided using the first and second buffers 430 and 431 respectively. The activity along 445 and 446 becomes inputs for the downstream neurons.

When neurons $N_A$ and $N_C$ are activated simultaneously, inter-postsynaptic functional link [$Post_{B1}$-$Post_{D1}$] is formed. When this functional link is not re-activated, it remains in a dormant state from a certain period of time depending on its life-span. The latch 1000 represents the dormant inter-postsynaptic functional link. Following associative learning, if sensory inputs do not arrive through the neurons $N_A$ or $N_C$, then the OR gate 900 is closed. This activates the inverter 920, which in turn activates three downstream timers 800, 801 and 802. This results in three downstream events. 1) Triggering of the timer 800 that controls the duration of functioning of the latch 1000, which represents the inter-postsynaptic functional link. 2) Triggering of the timer 801 that controls the duration of functioning of a second latch 1001 that determines the duration of activation of the postsynaptic terminals, which are represented by the cathodes of the diodes 555 and 999. 3) Triggering of the timer 802 that controls the duration of functioning of a third latch 1002, which determine the duration of activity at the output postsynaptic dendrites 445 and 446. Latches 1001 and 1002 function continuously when activity arrives through either one of the inputs, only when the latch 1000 representing the inter-postsynaptic functional link remains activated. If the latch 1000 remains active, then the arrival of activity at any one of the inputs enables activation of the cathode of either the diode 555 or the diode 999 that represents the functionally linked postsynaptic terminal. Thus, the duration of the inter-postsynaptic functional links, the duration of re-activation of the functionally linked postsynaptic terminals, and the duration of activation of dendrites of the functionally linked postsynaptic terminals are functions initiated by the stoppage of arrival of activity to both the first and second diodes 555 and 999 that represent synapses of the functionally linked postsynaptic terminals.

This circuit allows maintaining the inter-postsynaptic functional link until its life-span is over, even in the absence of the arrival of continuous activity for continuous activation of either one of the linked postsynaptic terminals. Similarly, even in the absence of neuronal output from the unit, this circuit maintains inter-postsynaptic functional links until its life-span is over. The life-span of the inter-postsynaptic functional link is achieved in the circuit through the predetermined set time of the timer 800. The timers 801 and 802 are set for a short time compared to the timer 800. After the life-span of the inter-postsynaptic functional link is over, the arrival of activity through either the synapses 555 and 999 only provides outputs though their corresponding outputs 445 and 446 respectively as occurred before associative learning. The arrangements of the OR gates 428, 429, 910 and the AND gates 901 and 902 enable the circuit to accomplish these functions.

The functioning of the electronic circuit in the preferred embodiment of the disclosure can be explained as occurring in four states. At resting state, the activation of the neurons $N_A$ or $N_C$ results in separate outputs from the corresponding output terminals 445 and 446 of those neurons. The second state is the formation of the functional link between the postsynaptic terminals during associative learning, which is represented by the activation of the latch 1000. The third state occurs when activity stops arriving at both the inputs. This leads to activation of three timers, which in turn controls the life-span of the inter-postsynaptic functional link, duration of activation of the linked postsynaptic terminals and activity along the linked postsynaptic dendrites towards the cell bodies of their neurons. The forth state is the re-activation of the inter-postsynaptic functional link when activity arrives at either one of the postsynaptic terminals that participated in the formation of the inter-postsynaptic functional link, provided the functional link remains re-activatible (meaning that its life-span is not completed). This re-activation of the inter-postsynaptic functional link results in the activation of the linked postsynaptic terminal together with spread of activity along the dendrites of the linked postsynaptic terminals. Duration of the re-activatible state of the functionally linked postsynaptic terminal is dependent on the duration of existence of the inter-postsynaptic functional link. Life-span of the inter-postsynaptic functional links, their duration of re-activatible state and the duration of flow of activity through the output postsynaptic dendrites are determined by the preset values in the timers 800, 801 and 802 respectively.

An electronic circuit given in FIG. 11 demonstrates the preferred embodiments of the disclosure. It should be appreciated by those of skill in the art that the techniques disclosed in the example represent techniques discovered by the inventors to function well in the practice of the disclosure, and thus can be considered to constitute preferred modes for its practice. The functional link between the postsynaptic terminals is built using electronic circuits in order to provide all its functional attributes and is described in FIGS. 6 and 11. This consists of a) inputs reaching at the neurons triggering action potential when threshold numbers of them arrive at the axon hillock, b) action potentials traversing to the output terminals (presynaptic terminals) activating the synapses at the their terminals, and c) activity reaching the postsynaptic terminals. When simultaneous activation of closely located postsynaptic terminals of different neurons takes place, it induces a functional link between those postsynaptic terminals. The formed inter-postsynaptic functional link is re-activated by activity arriving at either one of the postsynaptic terminals from their respective inputs. Each inter-postsynaptic functional link has its life-span. This is represented by a time-period during which inter-postsynaptic functional link becomes re-activatible. This re-activation of the inter-postsynaptic functional link results in the spread of activity towards the postsynaptic terminal of the second synapse that already had functionally linked during previous associative learning event.

Circuits may comprise circuit boards or printed circuit boards (PCBs) with electronic components on it. Suitable packets may include chips, integrated circuits and PCBs. The fabrications can be made using different materials. The label on the fabrication may indicate that the composition is used for replicating the functional relationship between the postsynaptic terminals, to study the effect of re-activation of functional link formed between the postsynaptic terminals by arrival of activity at any one of the linked postsynaptic terminals within the re-activatible time-period and for studying and utilizing systems and emerging effects resulting from arranging the units in large numbers. The label on the fabrication may also indicate directions for uses such as those described above. The circuit in the disclosure typically comprise the fabrication described above and one or more other fabrications comprising materials desirable from a commercial and user standpoint, including circuit boards, connectors, power sources, measuring instruments, and package inserts with instructions for use.

The artificial neuronal circuit according to the present invention can be embodied as a unit element in several types of neuronal network system. It is understood that various other modifications will be apparent to and can be made by those who skilled in the art without departing from the scope and spirit of this invention. The duration of the inter-postsynaptic functional link, the duration of activation of the postsynaptic terminals following the formation of the inter-postsynaptic functional links and the duration of output from the system are controlled by adjusting the timers in the circuit enabling using these units in different combinations to simulate nervous systems of different connectional complexities between the neurons. At ordinary locations, neurons are interconnected through vertical propagation of activity by synaptic transmission. By inactivating the latch 1000, the circuit units can be used to build neuronal circuitries similar to those at locations where inputs do not converge. At locations of convergence, for example the hippocampus, postsynaptic terminals of different neurons are closely located and lead to the formation of inter-postsynaptic functional link when simultaneously stimulated.

Oscillating neuronal activities occur at certain neuronal orders where activities different neuronal orders converge. The vertical component of the oscillation is provided by the vertical flow of current by normal synaptic transmission through the synapses. The horizontal flow of voltage through the inter-postsynaptic functional can provide the horizontal component required for the oscillatory neuronal activities. This is an expected attribute of the basic functional building units of the nervous system. While the invented circuit unit uses excitatory synapses, inhibitory neuronal connections can be added to the circuitry by simple modification of the present circuit units. The invented unitary circuit can be used to examine the systems properties that can evolve from arranging them in large numbers and in different orders as seen in different nervous systems and at different locations within a nervous system. Some exemplary embodiments pertain to inter-postsynaptic connections similar to that of the human nervous system that can be used for developing artificial intelligence. Accordingly, it is not intended that the scope of the claims appended hereto be limited to the descriptions as set forth herein, but rather that the claims be construed as encompassing all the features of patentable novelty that reside in the present invention, including all the features that would be treated as equivalents thereof by those skilled in the art, which this invention pertains.

The present invention pertains to an electronic circuit that can provide the operation of inter-postsynaptic functional link taking place between the postsynaptic terminals of the synapses at the time of associative learning, which can be re-activated by one of the stimuli used in associative learning. The specific features of this circuit comprising Synaptic delay, uni-directionally operating arrangement of electronic components for unidirectional flow of activity through the synaptic junctions, and provision for arrival of miniature excitatory postsynaptic potentials.

Multiple units of the same electronic circuit can be arranged one after the other similar to the synaptic connections that are present in most locations in the nervous system.

Feedback loops can be built from any downstream unit to any upstream unit that are arranged laterally and sideways, to mimic recurrent collateral connections as seen in the nervous system.

Logic gates and latches within the integrated circuit operating to form inter-postsynaptic functional link capable of getting re-activated when one of the inputs is activated.

Timers that are activated in the absence of arrival of activity through any one of the inputs that controls life-span of the inter-postsynaptic functional link, duration of re-activation of postsynaptic terminals and the duration of outputs through the output terminals.

Output terminals from one unit that can provide input to the input terminals of the next unit making it possible to arrange large number of units in various possible ways to utilize the emerging systems functions.

The invention claimed is:

1. An electronic neuronal circuit system to model the interaction between a first postsynaptic terminal of a first synapse formed between a first neuron and a second neuron and a second postsynaptic terminal of a second synapse formed between a third neuron and a fourth neuron, comprising:

a first comparator to model the first neuron that provides the first presynaptic terminal of the first synapse;

a second comparator to model the third neuron that provides the second presynaptic terminal of the second synapse;

a first plurality of diodes connected to the first comparator to model the first synapse at the first presynaptic terminal of the first synapse between the first neuron and the second neuron;

a second plurality of diodes connected to the second comparator to model a second synapse at the second presynaptic terminal of the second synapse between the third neuron and the fourth neuron;

a first diode, which terminates the first plurality of diodes, having a first cathode to model the postsynaptic terminal of the first synapse between the first neuron and the second neuron;

a second diode, which terminates the second plurality of diodes, having a second cathode to model the postsynaptic terminal of the second synapse between the third neuron and the fourth neuron, wherein the neural circuit system includes an AND gate and a latch to model an inter-postsynaptic functional link between the postsynaptic terminal of the first synapse and the postsynaptic terminal of the second synapse, and wherein the neural circuit system includes a second timer-controlled latch to control the duration of reactivation of the inter-postsynaptic functional link.

2. An electronic neuronal circuit system to model the interaction between a first postsynaptic terminal of a first synapse formed between a first neuron and a second neuron and a second postsynaptic terminal of a second synapse formed between a third neuron and a fourth neuron, comprising:

a first comparator to model the first neuron that provides the first presynaptic terminal of the first synapse;

a second comparator to model the third neuron that provides the second presynaptic terminal of the second synapse;

a first plurality of diodes connected to the first comparator to model the first synapse at the first presynaptic terminal of the first synapse between the first neuron and the second neuron;

a second plurality of diodes connected to the second comparator to model a second synapse at the second presynaptic terminal of the second synapse between the third neuron and the fourth neuron;

a first diode, which terminates the first plurality of diodes, having a first cathode to model the postsynaptic terminal of the first synapse between the first neuron and the second neuron;

a second diode, which terminates the second plurality of diodes, having a second cathode to model the postsynaptic terminal of the second synapse between the third neuron and the fourth neuron, wherein the neural circuit system includes an AND gate and a latch to model an inter-postsynaptic functional link between the postsynaptic terminal of the first synapse and the postsynaptic terminal of the second synapse, and wherein the neural circuit system includes a third timer-controlled latch to control a duration of flow of activity through an output of postsynaptic dendritic terminals.

* * * * *